United States Patent [19]

Fisch

[11] Patent Number: 4,809,538
[45] Date of Patent: Mar. 7, 1989

[54] ULTRASONIC LEAK DETECTOR

[75] Inventor: Alfred C. Fisch, Clarkston, Mich.

[73] Assignee: Oakland Engineering Inc., Pontiac, Mich.

[21] Appl. No.: 82,537

[22] Filed: Aug. 7, 1987

[51] Int. Cl.$^4$ .................. G01M 3/24; B65G 25/00
[52] U.S. Cl. ................. 73/40.5 A; 209/590; 209/914
[58] Field of Search ............ 73/40.5 A, 45, 45.1, 73/45.2, 45.4, 41, 592; 209/590, 914; 198/346.2, 621

[56] References Cited

U.S. PATENT DOCUMENTS

| | | | |
|---|---|---|---|
| 3,313,143 | 4/1967 | Evans et al. | 73/41 |
| 3,457,775 | 7/1969 | Hinderer et al. | 73/45.2 |
| 3,795,137 | 3/1974 | Lo et al. | 73/45.4 |
| 3,841,468 | 10/1974 | Eggert | 198/621 |
| 4,096,736 | 6/1978 | Moshier | 73/40 |
| 4,116,043 | 9/1978 | Pencak | 73/40 |
| 4,273,507 | 6/1981 | Herdzina et al. | 198/621 |
| 4,336,438 | 6/1982 | Uehara et al. | 198/346.2 |
| 4,511,029 | 4/1985 | Okawa | 198/621 |
| 4,735,303 | 4/1988 | Wallis | 198/621 |

Primary Examiner—Stewart J. Levy
Assistant Examiner—Lawrence G. Fess
Attorney, Agent, or Firm—Barnes, Kisselle, Raisch, Choate, Whittemore & Hulbert

[57] ABSTRACT

Ultrasonic leak detection apparatus which includes a cycloidal transfer mechanism for sequentially feeding a plurality of workpieces to a test station. An elevator at the test station alternately lifts workpieces in sequence to an elevated position to a test chamber and lowers workpieces from the test chamber to the transfer mechanism. An enclosure cooperates with the elevator to form the test chamber in which the workpiece is pressurized and microphones detect any leakage of air through cracks or the like. A reject station downstream of the test station includes facility for removing defective workpieces from the transfer line.

23 Claims, 4 Drawing Sheets

ULTRASONIC LEAK DETECTOR

The present invention is directed to apparatus for testing workpieces, particularly formed metal parts, for defects by pressurizing one portion of the part and ultrasonically detecting defects such as cracks or the like as a function of air leakage.

Pressed metal stampings are prone to leaks through fine draw splits caused by stretching of the metal to make the part. Such fine cracks and splits often cannot be detected by the unaided eye. Welding operations are another major cause of leaks in fabricated metal parts. Whenever brackets, internal baffles or other items are welded onto a part, there is a chance for burn-through. A common example would be automotive oil pans. The nuts which accept threaded male drain plugs are welded onto the pans. Additionally, automatic machines which insert and tighten the drain plugs can cause leaks by cross-threading the plug into the nut.

It has heretofore been proposed to test for such leaks ultrasonically in a sound-proof enclosure. In a device heretofore marketed by applicant's assignee, a transfer line sequentially feeds a plurality of workpieces such as oil pans, valve covers or catalytic converter housings to a test station. An elevator at the test station lifts workpieces in sequence from the transfer line to an elevated position in which the workpiece is positioned within and enclosed by a sound chamber. An air supply selectively feeds air under pressure into the workpiece enclosed in the chamber, and one or more microphones ultrasonically detect air leakage from within the workpiece. The sound chamber is formed by a single cup-shaped enclosure wall having an opened bottom edge which sealingly engages the elevator in the upper or test position of the latter.

Although the device so described has enjoyed substantial commercial acceptance and success, improvements remain desirable. One object of the present invention is to provide an improved indexing mechanism for sequentially feeding workpieces to the elevator which is more economical to manufacture than that in such prior art device and which possesses greater versatility in terms of the geometry of parts that can be handled. Another object of the present invention is to provide improved test chamber and elevator structures with enhanced sealing contact therebetween and with enhanced insulation of the microphone detectors against ambient noise and the like.

The invention, together with additional objects, features and advantages thereof, will be best understood from the following description, the appended claims and the accompanying drawings in which:

Figure 1:
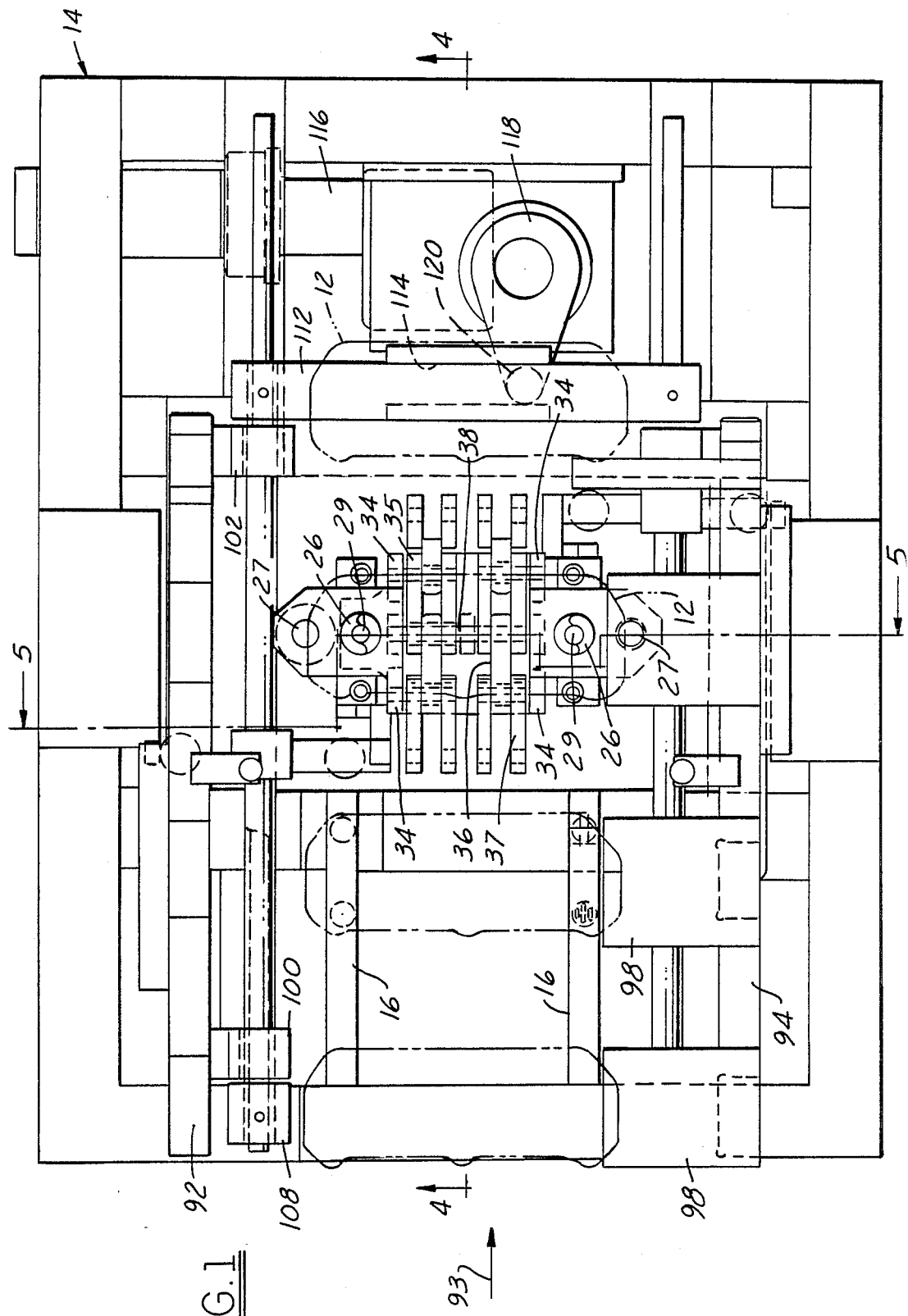
FIG. 1 is a top plan view of test apparatus in accordance with the invention with sound chamber removed, FIG. 1 being taken substantially along the line 1—1 in FIG. 4.

A presently preferred embodiment 10 of test apparatus in accordance with the invention is illustrated in the drawings and described hereinafter in conjunction with testing of valve covers 12 of exemplary geometry. It will be appreciated, however, that the principles of the invention to be described are in no way limited to valve covers of this or any other specific geometry, and indeed can be applied equally as well to other open structures such as oil pans, pump housings and manifolds, as well as to essentially closed structures such as mufflers and catalytic converter housings.

Figure 4:
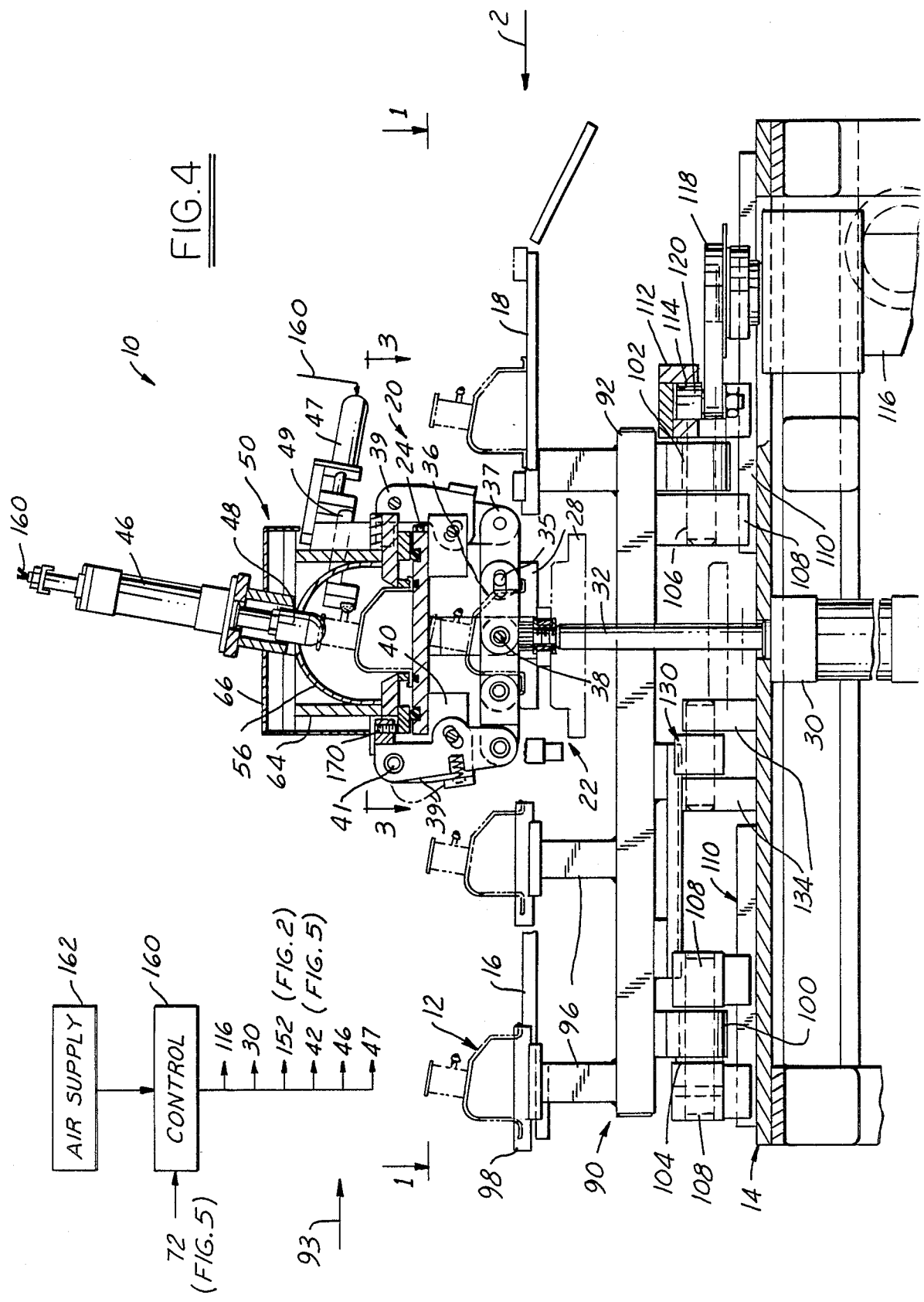
FIG. 4 is a side sectional view taken substantially along the line 4—4 in FIG. 1.
Figure 5:
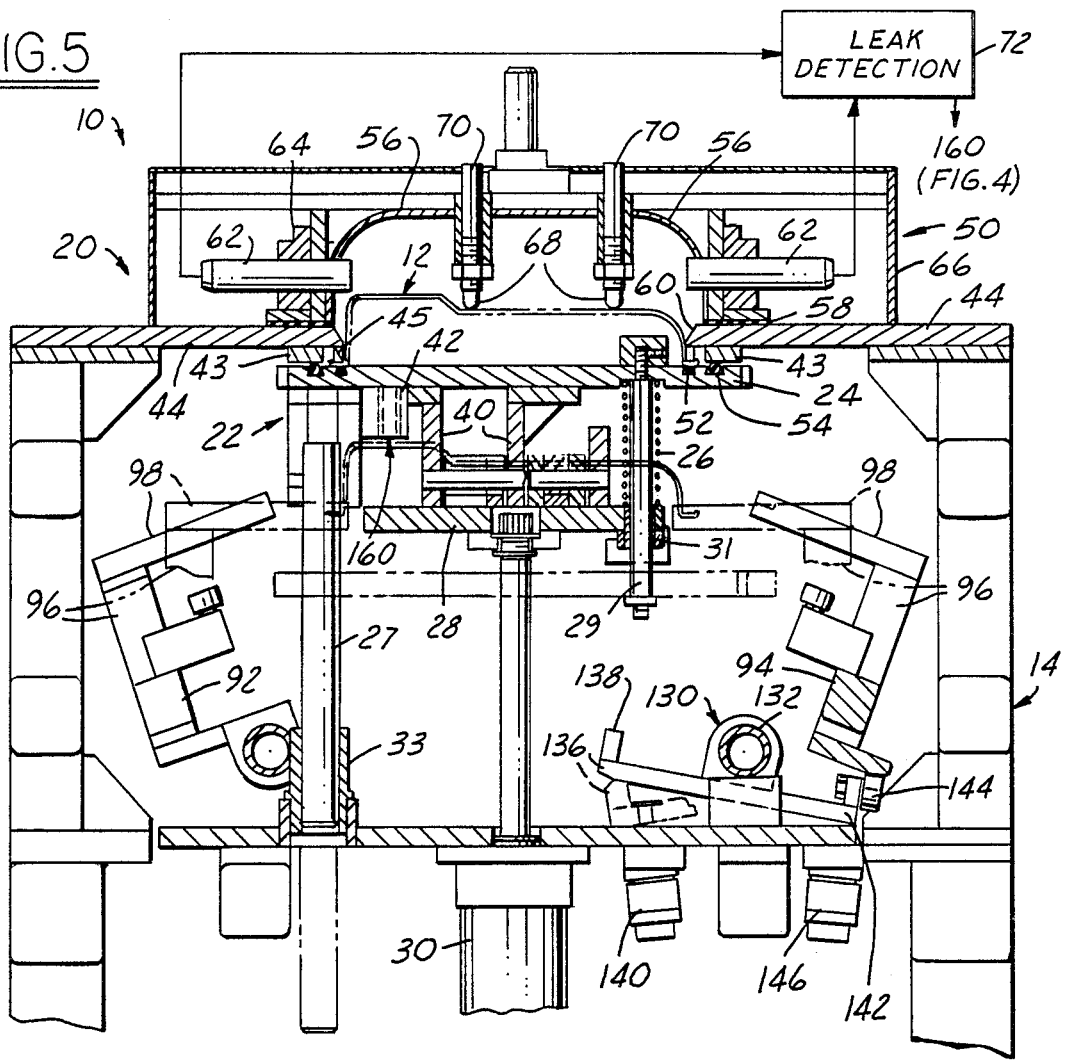
FIG. 5 is a fragmentary sectional view taken substantially along the line 5—5 in FIG. 1.

Test apparatus 10 is illustrated in the drawings as comprising a base 14 of welded steel tube stock or the like. A pair of low-friction support rails 16 (FIGS. 1 and 4) and a support plate 18 (FIGS. 2 and 4) are affixed to base 14 to form a workpiece support plane on opposite sides of an ultrasonic test station 20. At station 20, and as best seen in FIGS. 4 and 5, an elevator 22 is formed by an elevator plate 24 which is resiliently supported above an elevator drive plate 28 by a series of springs 26 (FIGS. 1 and 5), and is guided with respect thereto by the pins 29 affixed to plate 24 and extending through springs 26 and bearings 31 in drive plate 28. Additional pins 27 (FIGS. 1 and 5) are affixed to and extend downwardly from elevator plate 24 through bearings 33 on frame 14 for guiding elevator plate 24 with respect thereto while maintaining horizontal orientation of plate 24. A pneumatic or hydraulic ram 30 is mounted to base 14 and has a rod 32 projecting vertically therefrom and coupled to the underside of drive plate 28. Thus, drive plate 28 moves vertically with respect to the horizontal support plane defined by rails 16 under control of ram 30.

A bearing support 34 (FIG. 1) is upstanding from each corner of drive plate 28. Pivot shafts 35 (FIGS. 1 and 4) extend laterally between supports 34 on each side of plate 28. Inwardly and outwardly extending links 36,37 are pivotally mounted on each shaft 35, inwardly extending links 36 being slotted as best seen in FIG. 4 for accommodating motion lengthwise of the transfer line. Links 36 are centrally pivotally coupled by a shaft 38 (FIGS. 1 and 4). Clamp arms 39 are centrally pivotally mounted to brackets 40 which depend from elevator plate 24. The lower ends of clamp arms 39 are pivotally coupled to the outer ends of links 37. The second or link-remote ends of clamp arms 39 on each side of elevator plate 24 are joined by a pin 41. An air fitting 42 is carried by plate 24 and is connected by a suitable flexible conduit (not shown) to an air control 160 (FIG. 4).

An ultrasonic test enclosure 50 (FIGS. 4 and 5) is affixed to base 14 and carried above the workpiece support plane and above elevator 22. In particular, elevator plate 24 has a pair of resilient seals 52,54 positioned in corresponding grooves in the upper surface of the elevator plate. Inner seal 52 is contoured for sealing engagement with the peripheral edge of a workpiece 12. Outer seal 54 in the upper position of plate 24 (FIG. 5) sealingly engages a rib 43 which depends from a chamber support 44 carried by base 14. An inner rib 45 extends entirely around an aperture 60 in support 44 and is contoured to urge the periphery of a workpiece 12 into sealing engagement with seal 52 in the upper position of elevator 22. Enclosure 50 is formed by a closed inner wall 56 mounted on support 44 by the sealing gasket 58 surrounding aperture 60, and an outer enclosure wall 66 carried by support 44 entirely surrounding and spaced from inner wall 56. A plurality of ultrasonic microphones 62 are mounted on support 44 by brackets 64 externally adjacent to enclosure wall 56 while being insulated from base 14 by gaskets 58. Microphones 62 project through sealed apertures in enclosure wall 56. Outer enclosure wall 66 encloses microphones 62, thus providing enhanced insulation of the microphones from ambient noise and the like. A pair of release pins 68 capture compression springs within corresponding guides 70 and function to urge workpiece 12 downwardly when elevator 22 moves downwardly for returning the workpiece to the indexing mechanism following a test operation. Microphones 62 are coupled to suitable leak detection electronics 72.

Rams 46,47 (FIG. 4) are carried by enclosure 50 and have plungers 48 49 contoured for sealing engagement with apertures in workpiece 12. In the illustrated embodiment for testing valve covers, ram 46 and plunger 48 selectively plug the oil fill opening in the cover 12 positioned by plate 24 within chamber 50, and ram 47 and plunger 49 selectively plug the vent opening. Rams 47,46 are connected to air control 160. It will be appreciated that the illustrations and contours of plate 24 with seals 52,54 and support 44 with fingers 43,45 vary with workpiece contour. Likewise rams 46,47 will vary in position for other structures, such as an oil pan, and indeed may be entirely deleted for structures having no openings to be sealed.

Figure 6:
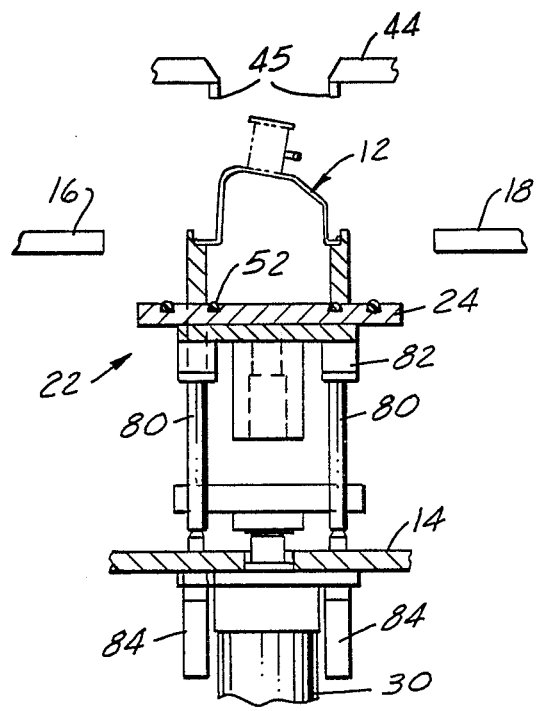
FIG. 6 is a fragmentary side elevational view showing the elevator in FIG. 4 in the lowered position.

An array of pins 80 (FIG. 6) are slidably carried in bearing guides 82 which depend from elevator plate 24. In the lowered position of elevator 22 as illustrated in FIG. 6, pins 80 engage springs 84 carried by base 14 adjacent to ram 30. The upper ends of pins 80 are positioned and contoured so as to engage and hold the periphery of workpiece 12. Thus, as elevator 22 is lowered, pins 80 function both to release workpiece 12 from sealing engagement with seal 52 and to position workpiece 12 in the support plane formed by rails 16 and plate 18 for indexing as will be described.

An indexing mechanism 90 is carried by base 14 for transporting workpieces 12 in sequence to and from test station 20. Indexing mechanism 90 comprises a pair of carrier bars 92,94 positioned adjacent to opposite lateral sides of base 14 parallel to the longitudinal direction of travel 93 (FIGS. 1 and 4) of workpieces 12. A plurality of spaced carrier arms 96 (FIGS. 4 and 5) are affixed to and project upwardly from bar 92 in a longitudinally spaced parallel array. Each arm 96 terminates in an inwardly projecting carrier hand 98 which is contoured at its inner or arm-remote end to engage one side edge of workpiece 12. A corresponding mirror-image array of carrier arms and hands are affixed to laterally opposed carrier bar 94. Each carrier bar 92,94 is pivotally mounted at longitudinally spaced ends to base 14. More specifically, and referring in particular to FIG. 4, bar 92 has a pair of hollow bearing bosses 100,102 depending therefrom and encircling the pivot pins 104,106. Pins 104,106 are affixed to collars 108 which slide on bearing ways 110 carried by base 14. Thus, each carrier bar is mounted for motion in the longitudinal direction by ways 110, and for pivoting motion by the pins 104,106 toward and away from the opposing bar. Collars 108 at one end of indexing mechanism 90 are interconnected by the drive bar 112 (FIGS. 2 and 4) which has a downwardly opening slot 114 formed therein. A drive motor 116 has an upwardly projecting shaft coupled to a radially extending drive arm 118. A bearing 120 is affixed to the end of arm 118 and positioned within slot 114 of bar 112. Motor 116 thus cooperates with bar 112 to form a cycloidal drive for conjointly moving carrier bars 92,94 longitudinally - i.e., in the direction 93 of motion of workpieces 12 through the test apparatus.

A carrier pivot arm or lever 130 (FIGS. 4 and 5) is positioned on opposite sides of base 14 beneath carrier bars 92,94. Each pivot arm 130 is centrally pivotally mounted to a pin or shaft 132 which is supported by the standoffs 134 (FIG. 4) carried by base 14. An internal end 136 of each arm 130 carries a bumper 138 positioned for abutting engagement with elevator drive plate 28 in the lower position of the latter for urging arm end 36 downwardly to the position shown in phantom in FIG. 5 against the force of the spring or shock absorber 140 mounted on base 14. The outer end 142 of each arm 130 is positioned beneath a corresponding carrier bar 92,94 and carries a roller 144 for engaging and pivotally driving the corresponding carrier bar about the pivot pins 104,106 (FIG. 6) while permitting cycloidal longitudinal motion of the carrier bars with respect to base 14. A shock absorber 146 is positioned beneath each outer arm end 142. Thus, in the lowered position of elevator 22, arms 130 urge carrier bars 92 to the workpiece-engaging position, while upward motion of the elevator releases the carrier arms and thus releases the workpieces to rest either upon guides 16, plate 18 or elevator pins 80 (FIG. 6).

Figure 2:
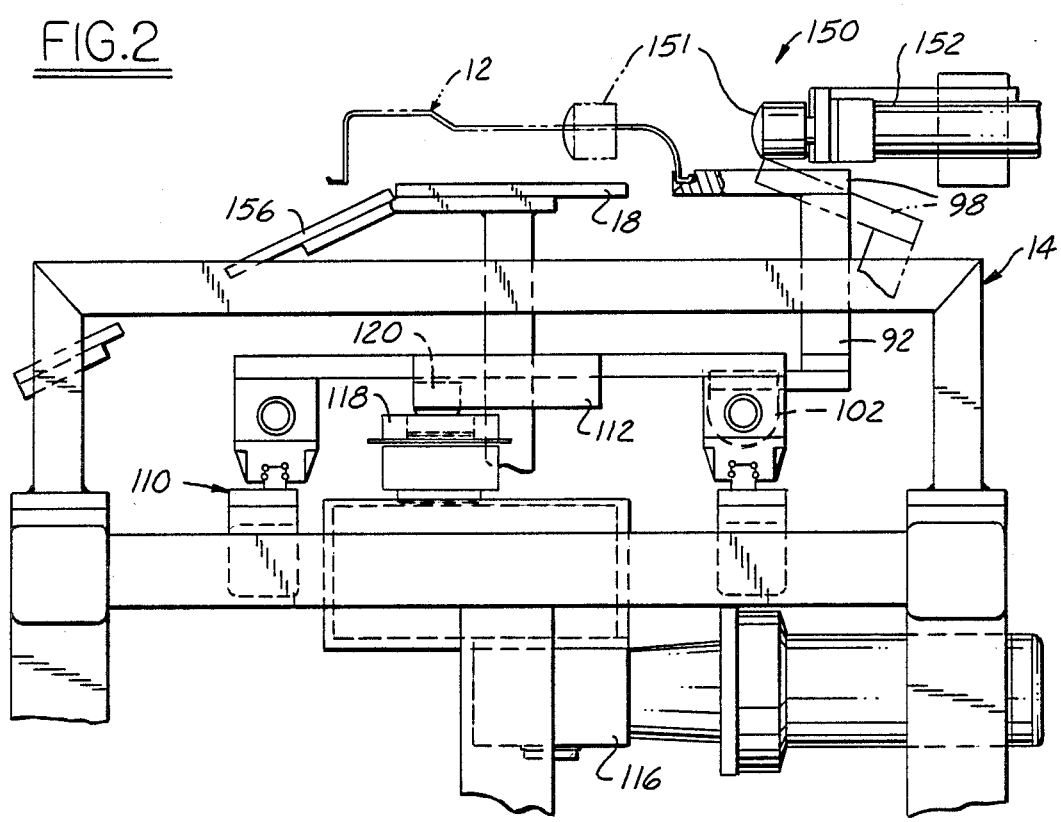
FIG. 2 is an end elevational view taken substantially from the direction 2 in FIG. 4.
Figure 3:
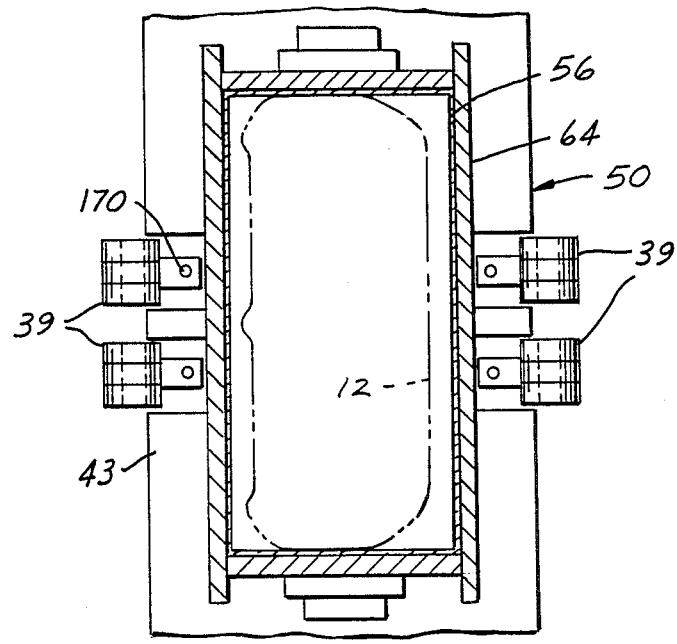
FIG. 3 is a fragmentary sectional view taken substantially along the line 3—3 in FIG. 4.

A part reject station 150 is illustrated in FIG. 2 and comprises a ram 152 mounted on base 14 laterally adjacent to support plate 18 and thus, in effect, downstream of test station 20. Ram 152 has a plunger 154 which may be extended to the position illustrated in phantom in FIG. 2 for urging a workpiece 12 adjacent thereto down the chute 156 into a reject bin or the like (not shown). An electropneumatic control 160 (FIGS. 4) is coupled to an air supply 162 and to leak detection electronics 72 (FIG. 5) for suitably driving motor 116, elevator ram 30, reject ram 152 (FIG. 2), workpiece sealing rams 46,47 and test fitting 42 (FIG. 5).

In operation, workpieces 12 are fed by suitable means (not shown) to guides 16 from the left as viewed in FIG. 4. Most preferably, the workpieces are presprayed with a surfactant to enhance the ultrasonic leak detection function, as is common in the art. Assuming that elevator 22 is initially in the upper or test position, as the elevator is lowered drive plate 28 engages carrier pivot arms 130 on opposite sides of the test apparatus so as to swing the carrier arms 96 and hands 98 into engagement with the workpieces. Drive 116 then cycles from the position illustrated in FIG. 4, at which arm 118 extends to the left, to a position at which arm 118 extends to the right, whereupon all workpieces 112 are indexed one position to the right. Elevator ram 30 is then energized by control 160. As the elevator rises, pivot arms 130 and carrier bars 92,94 are released so as to swing outwardly to the position illustrated in solid lines in FIG. 5. Workpieces are thereby released at the new or indexed positions. Drive 116 then continues rotation to the position illustrated in FIG. 4 at which the carrier arms are returned to their initial positions, and thus prepared to engage and index workpieces as described.

In the meantime, with carrier bars 92,94 in the outer positions, ram 30 is energized by control 160 and elevator 22 is raised. When elevator plate 24 reaches the level of the part support plane, the workpiece 12 on pins 80 (FIG. 6) is lifted therefor and carried upwardly toward test chamber 50. Seal 52 is, of course, positioned on plate 24 so as to engage the periphery of the part when lifted from pins 80. Drive plate 28 is normally urged downwardly with respect to plate 24 by springs 26, and clamp arms 39 are thus normally biased by springs 26 to the outer positions illustrated in phantom in FIG. 4.

When plate 24, seals 52,54 and workpiece 12 contact support ribs 43,45, continued upward motion of drive plate 28 urges the workpiece and elevator plate through springs 26 into sealing engagement with support 44 so as to close and seal the test chamber. Additionally, such continued upward motion comprises springs 26, carries shafts 35 upwardly so that links 36,37 pivot clamp arms 39 into clamping engagement with the outer periphery of the sound chamber. Sealing of the sound chamber is thereby enhanced by the action of clamp arms 39. Set screws 170 (FIG. 4) on clamp bodies 39 are for adjusting pressure of clamping engagement with enclosure 50. Rams 46,47 are then engaged by control 160 to close the test piece, and the test piece is pressurized through fitting 42. Any cracks or defects will thus manifest themselves in leakage of air under pressure, which will be detected in the usual and conventional manner by the microphones 62 and leak detection electronics 72.

Upon completion of a test sequence, the test piece is depressurized and plungers 48,49 are withdrawn. Ram 30 is then de-energized to lower the test piece as drive plate 28 is initially lowered. Clamp arms 39 are first swung out of engagement with support 44. Continued downward motion of plate 28 withdraws plate 24, and the test piece follows plate 24 under urging of release pins 68. When elevator plate 24 reaches the workpiece transfer phase, the workpiece carried thereby is transferred to pins 80. Continued downward motion of elevator 22 pivots carrier bars 92,94 inwardly through the agency of arms 130, and the cycle is repeated. In the event that a defective part is detected by microphones 62 and leak detection electronics 72, reject ram 52 is energized when that part is indexed to a position adjacent thereto, whereby the part is fed by chute 156 to a reject bin or the like.

The invention claimed is:

1. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means in a lowered position, means cooperating with a said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said sequentially-feeding means comprising a transfer line including support means defining a transfer plane, transfer means positioned on opposed sides of said support means for selectively engaging and disengaging workpieces on said support means, and indexing means coupled to said transfer means for selectively indexing said transfer means for moving workpieces sequentially along said support means onto said elevator means, characterized in that said transfer means comprises a base, first and second arrays of carriers positioned in pairs on opposed sides of said support means, means pivotally mounting each said array to said base for conjoint motion toward and away from the opposing array, and means coupled to said first and second arrays of carriers positioned for engagement with said elevator means in said lowered position for pivoting said carrier arrays toward said support means for engaging workpieces carried on said support means and on said elevator means, and in that said indexing means comprises means mounting both said ar to said base for conjoint motion parallel to said arrays.

2. The apparatus set forth in claim 1 wherein said indexing means comprises cycloidal drive means coupled to said carrier arrays for driving said arrays in one direction with said arrays pivoted toward each other and engaging the workpieces, and in the other direction with said arrays pivoted out of engagement with the workpieces, said elevator means and said cycloidal drive means being interconnected so as to advance workpieces with said elevator means in said lowered position.

3. The apparatus set forth in claim 2 wherein each said carrier array comprises a plurality of said carriers affixed to and projecting from a common carrier bar, said carrier bar extending in the direction of motion of said carrier arrays and being pivotally mounted to carrier support means, and bearing means mounting said carrier support means to said base for motion longitudinally of said base.

4. The apparatus set forth in claim 3 wherein said carrier-pivoting means comprises a pair of arms pivotally mounted on said base, each said arm including means at one end for abutting engagement with said elevator means for pivoting said arm with respect to said base, and means at the opposing end of said arm for pivoting the associated said carrier array with respect to said base.

5. The apparatus set forth in claim 4 wherein said means for pivoting the associated said carrier array includes means for sliding engagement with said carrier array as said transfer means indexes.

6. The apparatus set forth in claim 1 wherein said means cooperating with said elevator means comprising cup-shaped enclosure means having an open bottom edge with means at said open bottom edge for air-sealing engagement with said elevator means to form said chamber, said ultrasonically-detecting means being mounted on said enclosure means.

7. The apparatus set forth in claim 6 wherein said cup-shaped enclosure means comprises an inner cup-shaped wall and an outer wall enclosing said inner wall so as to form an intermediate chamber between said walls sealingly isolated from ambient, said ultrasonically-detecting means being mounted on said inner wall and being isolated from ambient by said outer wall.

8. The apparatus set forth in claim 6 wherein said means cooperating with said elevator means further comprises clamp means automatically responsive to movement of said elevator means to said elevated position for positively clamping said elevator means to said open bottom edge of said cup-shaped enclosure means.

9. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means, means cooperating with said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said means cooperating with said elevator means comprising cup-shaped enclosure means having an open bottom edge with means at said open bottom edge for air-sealing engagement with said elevator means to form said chamber, said ultrasonically-detecting means being mounted on said enclosure means, characterized in that said cup-shaped enclosure means comprises an inner cup-shaped wall and an outer wall enclosing said inner wall so as to form an intermediate chamber between said walls sealingly isolated from ambient, said ultrasonically-detecting means being mounted on said inner wall and being isolated from ambient by said outer wall.

10. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means, means cooperating with said elevator means at said test station in said elevated position of said chamber means for forming a sound chamber enclosing a workpiece on said elevator means, air supply means for selectively feeding air under pressure into a workpiece enclosed in said chamber, and means for ultrasonically detecting air leakage from within the workpiece, said means cooperating with said elevator means comprising cup-shaped enclosure means having an open bottom edge with means at said open bottom edge for air-sealing engagement with said elevator means to form said chamber, said ultrasonically-detecting means being mounted on said enclosure means, characterized in that said means cooperating with said elevator means further comprises clamp means automatically responsive to movement of said elevator means to said elevated position for positively clamping said elevator means to said open bottom edge of said cup-shaped enclosure means.

11. The apparatus set forth in claim 10 wherein said clamp means comprises a plurality of toggle clamps carried by said elevator means and means responsive to abutment of said elevator means with said enclosure means for swinging said toggle clamp means into clamping engagement with said enclosure means.

12. The apparatus set forth in claim 11 wherein each said toggle clamp comprises a clamp body having a central portion pivotally mounted to said elevator means, a first end portion extending above said elevator means for clamping engagement with said enclosure means and a second end portion, and wherein said swinging means comprises link means coupled to said second portion and to said elevator means.

13. The apparatus set forth in claim 12 wherein said clamps are positioned in pairs on opposite sides of said elevator means, and wherein said link means comprises a pair of links pivotally interconnected at one end to each other and to said elevator means, the other end of one link of said pair being pivotally connected to said second end portion of said clamp body and the other end of the other link of said pair being pivotally connected to corresponding end of the same link of the laterally opposed link pair.

14. The apparatus set forth in claim 13 further comprising means carried at said first end portion of each said clamp body for adjusting pressure of clamping engagement with said enclosure means.

15. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means in a lowered position, means cooperating with said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said sequentially-feeding means comprising a transfer line including support means defining a transfer plane, transfer means positioned on opposed sides of said support means for selectively engaging and disengaging workpieces on said support means, and indexing means coupled to said transfer means for selectively indexing said transfer means for moving workpieces sequentially along said support means onto said elevator means, said means cooperating with said elevator means comprising cup-shaped enclosure means having an open bottom edge with means at said open bottom edge for air-sealing engagement with said elevator means to form said chamber, said ultrasonically-detecting means being mounted on said enclosures means, characterized in that said transfer means comprises a base, first second arrays of carriers positioned in pairs on opposed sides of said support means, and means pivotally mounting each said array to said base for conjoint motion toward and away from the opposing array, in that said indexing means comprises means mounting both said arrays to said base for conjoint motion parallel to said arrays, and in that said cup-shaped enclosures means comprises an inner cup-shaped wall and an outer wall enclosing said inner wall so as to form an intermediate chamber between said walls sealingly isolated from ambient, said ultrasonically-detecting means being mounted on said inner wall and being isolated from ambient by said outer wall.

16. Ultrasonic leak test apparatus comprising transfer means for sequentially feeding a plurality of workpieces t a test station, elevator means at said test station for alternately lifting workpieces in sequence from said transfer means to an elevated position and lowering workpieces onto said transfer means in a lowered position, means cooperating with said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said sequentially-feeding means comprising a transfer line including support means defining a transfer plane, transfer means positioned on opposed sides of said support means of selectively engaging and disengaging workpieces on said support means, and indexing means coupled to said transfer means for selectively indexing said transfer means for moving workpieces sequentially along said support means onto said elevator means, said means cooperating with said elevator means comprising cup-shaped enclosure means having an open bottom edge with means at said open bottom edge for air-sealing engagement with said elevator means to form said chamber, said ultrasonically-detecting means being mounted on said enclosures means, characterized in that said transfer means comprises a base, first second arrays of carriers positioned in pairs on opposed sides of said support means, and means pivotally mounting each said array to said base for conjoint motion toward and away from the opposing array, in that said indexing means comprises means mounting both said arrays to said base for conjoint motion parallel to said arrays, and in that said means cooperating with said elevators means further comprises clamp means automatically responsive to movement of said elevator means to said elevated positioned for positively clamping said elevator means to said open bottom edge of said cup-shaped enclosure means.

17. The apparatus set forth in claim 16 wherein said transfer means further comprises means coupled to said first and second array of carriers positioned for engagement with said elevator means in said lowered position for pivoting said carrier arrays toward said support means for engaging workpieces carried on said support means and on said elevator means.

18. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means in a lowered position, means cooperating with said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said sequentially-feeding means comprising a transfer line including support means defining a transfer plane, transfer means positioned on opposed sides of said support means for selectively engaging and disengaging workpieces on said support means, and indexing means coupled to said transfer means for selectively indexing said transfer means for moving workpieces sequentially along said support means onto said elevator means, said means cooperating with said elevator means comprising cup-s enclosure means having an open bottom edge with means at said open bottom edge for air-sealing engagement with said elevator means to form said chamber, said ultrasonically-detecting means being mounted on said enclosures means, characterized in that said cup-shaped enclosures means comprises an inner cup-shaped wall and an outer wall enclosing said inner wall so as to form an intermediate chamber between said walls sealingly isolated from ambient, said ultrasonically-detecting means being mounted on said inner wall and being isolated from ambient by said outer wall.

19. Ultrasonic leak test apparatus comprising transfer means for sequentially feeding a plurality of workpieces to a test station, elevator means at said test station for alternately lifting workpieces in sequence from said transfer means to an elevated position and lowering workpieces onto said transfer means in a lowered position, means cooperating with said elevator means at said test station in said elevated position of said elevator means for forming a sound chamber enclosing a workpiece on said elevator means, air supply means for selectively feeding air under pressure into a workpiece enclosed in said chamber, and means for ultrasonically detecting air leakage from within the workpiece, said sequentially-feeding means comprising a transfer line including support means defining a transfer plane, transfer means positioned on opposed sides of said support means of selectively engaging and disengaging workpieces on said support means, and indexing means coupled to said transfer means for selectively indexing said transfer means for moving workpieces sequentially along said support means onto said elevator means, said means cooperating with said elevator means comprising cup-shaped enclosure means having an open bottom edge with means at said open bottom edge for air-sealing engagement with said elevator means to form said chamber, said ultrasonically-detecting means being mounted on said enclosures means, characterized in that said means cooperating with said elevators means further comprises clamp means automatically responsive to movement of said elevator means to said elevated positioned for positively clamping said elevator means to said open bottom edge of said cup-shaped enclosure means.

20. The apparatus set forth in claim 19 wherein said clamp means comprises a plurality of toggle clamps carried by said elevator means and means responsive to abutment of said elevator means with said enclosure means for swinging said toggle clamp means into clamping engagement with said enclosure means.

21. The apparatus set forth in claim 20 wherein each said toggle clamp comprises a clamp body having a central portion pivotally mounted to said elevator means, a first end portion extending above said elevator means for clamping engagement with said enclosure means and a second end portion, and wherein said swinging means comprises link means coupled to said second portion and to said elevator means.

22. The apparatus set forth in claim 21 wherein said clamps are positioned in pairs on opposite sides of said elevator means, and wherein said link means comprises a pair of links pivotally interconnected at one end to each other and to said elevator means, the other end of one link of said pair being pivotally connected to said second end portion of said clamp body and the other end of the other link of said pair being pivotally connected to corresponding ends of the same link of the laterally opposed link pairs.

23. The apparatus set forth in claim 22 further comprising means carried at said first end portion of each said clamp body for adjusting pressure of clamping engagement with said enclosure means.

* * * * *